Dec. 11, 1956  E. BIRCHER  2,773,310
TELESCOPE SIGHT MOUNT
Filed May 26, 1952  3 Sheets-Sheet 1
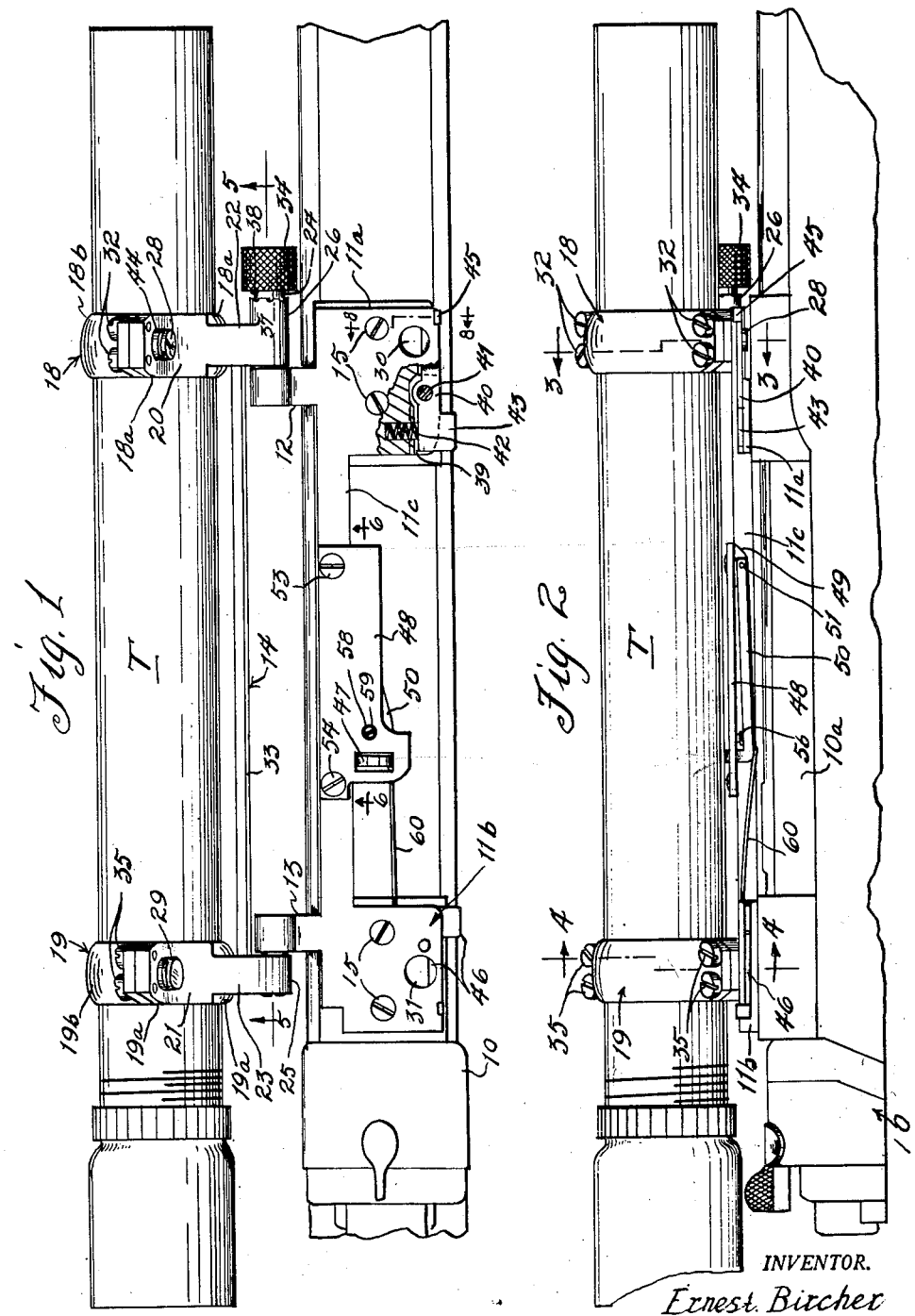
INVENTOR.
Ernest Bircher
BY Greek Wells
Atty.

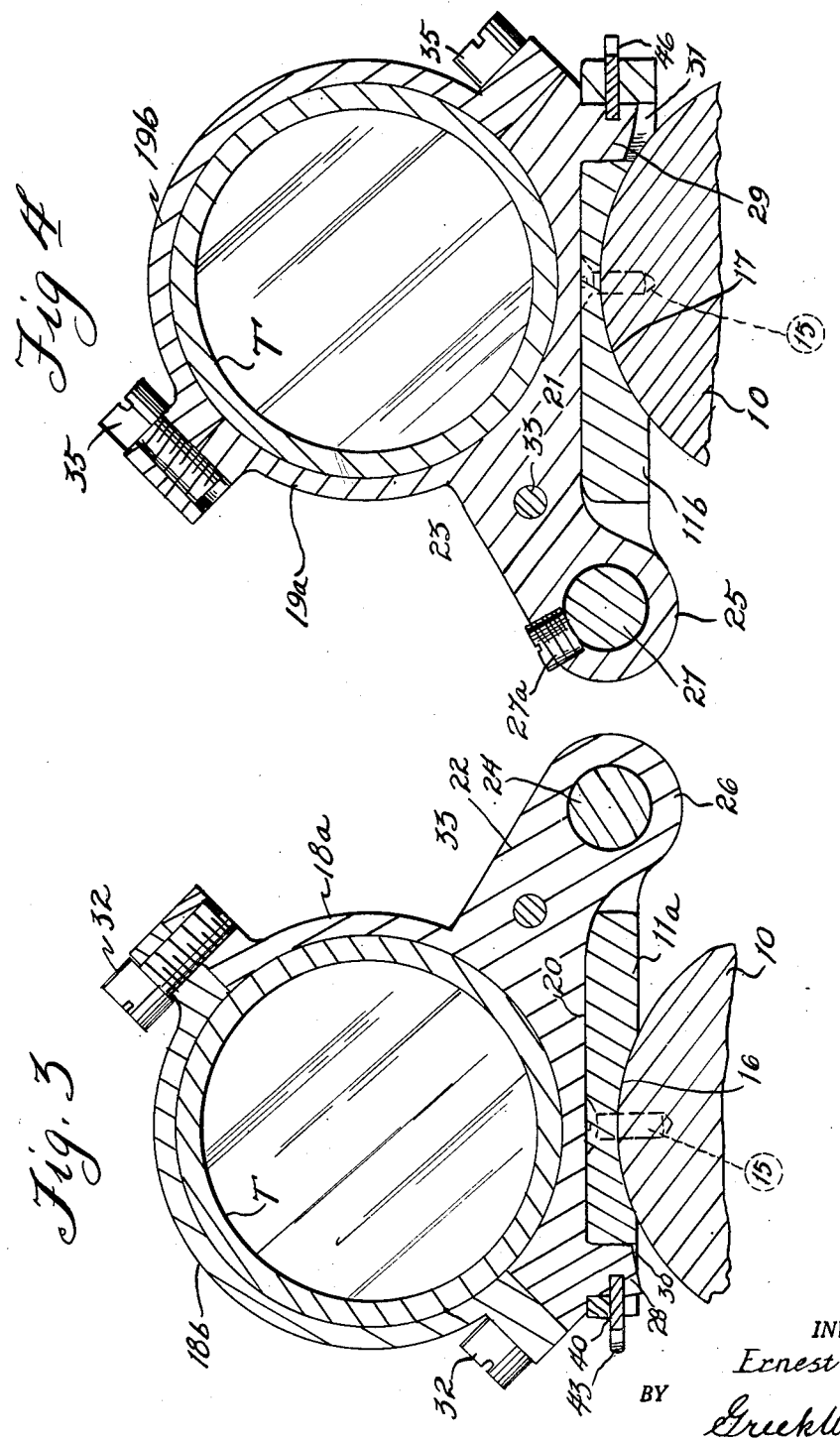

Dec. 11, 1956     E. BIRCHER     2,773,310
TELESCOPE SIGHT MOUNT
Filed May 26, 1952     3 Sheets-Sheet 3
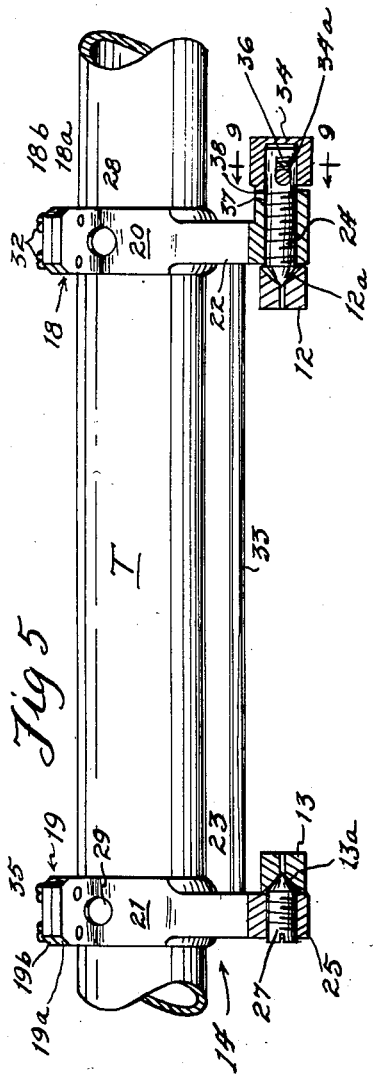
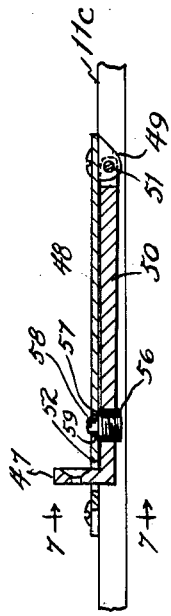
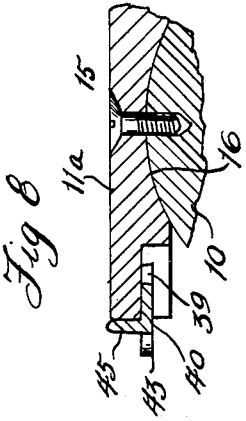
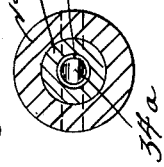
INVENTOR.
Ernest Bircher
BY
GreekWells
Atty.

United States Patent Office 2,773,310
Patented Dec. 11, 1956

2,773,310

TELESCOPE SIGHT MOUNT

Ernest Bircher, Palouse, Wash.

Application May 26, 1952, Serial No. 290,043

1 Claim. (Cl. 33—50)

The present invention relates to improvements in mounts for telescope sights. It is the principal purpose of the present invention to provide an improved telescope sight mount which consists of one unit that is permanently mounted on the rifle, a second unit that is pivotally and removably mounted on the first unit so that it can be thrown back out of the way in case the telescope sights fog up, together with a novel means for positively seating the movable unit on the unit that is fixed to the gun.

I am aware that there are several telescope sight mounts for rifles and that some of these provide telescope holding units which can be thrown back out of the way and returned when the telescope sight is to be used again. A particular improvement of my device over these prior art devices with which I am familiar, lies in the fact that my sight mount provides means on the two cooperating units for positively assuring accurate seating of the movable unit on the unit fixed to the gun by a simple and effective interlock of the one unit on the other, combined with a pivotal mounting of the one unit on the other unit that can be quickly released so that the telescope holding unit can be taken from one gun and applied to another gun having a duplicate of the base unit mounted thereon.

It is also a purpose of my invention to provide a novel telescope sight mount for rifles having means thereon to provide a rear peep sight for the rifle which is always ready to use when the telescope sight is thrown back out of the way and which does not interfere with the operation of the telescope sight.

A further purpose of my invention is to provide an improved telescope sight mount for rifles having a base unit that is provided with two saddles spaced apart and rigidly connected by an intermediate bar, the two saddles being mountable on the rifle with screws, together with locating apertures in the saddles, a telescope carrying framework having pivots cooperating with similar pivots on the first named unit and having locating pins adapted to seat in the apertures of the first named unit.

The nature and advantages of the invention will appear more fully from the following description and the accompanying drawings. It should be understood however, that the drawings and description are illustrative only and are not intended to limit the invention except insofar as it is limited by the claim.

In the drawings:

Figure 1 is a plan view of a portion of a rifle showing my improved telescope sight mounted thereon with the telescope sight thrown back out of the way;

Figure 2 is a view in side elevation showing the telescope sight and mount in the normal position for using the telescope sight;

Figures 3 and 4 are enlarged fragmentary section views taken on the lines 3—3 and 4—4 respectively of Figure 2;

Figure 5 is a sectional view taken on the line 5—5 of Figure 1;

Figure 6 is a sectional view taken on the line 6—6 of Figure 1;

Figure 7 is an enlarged fragmentary sectional view taken on the line 7—7 of Figure 6;

Figure 8 is an enlarged fragmentary sectional view taken on the line 8—8 of Figure 1; and Figure 9 is a fragmentary sectional view taken on the line 9—9 of Figure 5.

Referring now in detail to the drawings and in particular to Figures 1 and 2, my telescope sight mount is shown as applied to a bolt action rifle 10. The mount itself comprises a base unit 11 which has two end mounting portions 11a and 11b connected by a bar 11c which is offset to one side with respect to the center line of the rifle 10 so as not to obstruct the ejection area 10a of the rifle. The base unit 11 has two ears 12 and 13 projecting outwardly from the portions 11a and 11b to mount the telescope holding unit 14 for pivotal movement between the portions shown in Figures 1 and 2. The portions 11a and 11b are drilled and countersunk to receive screws 15. These screws 15 serve as means for securing the portions 11a and 11b to the rifle. As best illustrated in Figures 3 and 4, the portions 11a and 11b are so shaped that they may be recessed as indicated at 16 and 17 to fit the particular gun on which they are mounted.

The telescope holding unit 14 comprises two split ring members 18 and 19. The lower half 18a of the split ring 18 has a flat bottom surface 20 which is adapted to lie flat upon the top surface of the end piece 11a so that the ring 18 is solidly supported when the telescope is in firing position. An arm 22 extends from the lower half 18a into overlapping position with the ear 12 and is pivotally mounted on ear 12 by a cone tipped screw 24 which is threaded into a boss 26 at the end of the arm 22. The lower half 18a of the split ring 18 is formed with a locating pin 28 which is adapted to seat in the locating aperture 30 in the end portion 11a of the base unit. The top half 18b of the split ring 18 is secured to the lower half 18a by screws 32.

The split ring 19 has its lower half 19a provided with a flat face 21 which is adapted to rest on the flat top surface of the end piece 11b to give a solid support for the telescope when it is in firing position. The lower half 19a has an arm 23 which is provided with a boss 25 which overlaps the ear 13 and is pivoted thereto by a cone tipped screw 27. The lower half 19a also has a locating pin 29 which is adapted to seat in a locating aperture 31 in the end portion 11b of the base unit. The arms 22 and 23 are secured to each other by a bar 33. The bar 33 serves to hold the split rings 18 and 19 at the proper distance apart and to connect them so that they may be handled as a unit. The upper portion 19b of the split ring 19 is secured to the lower portion 19a by screws 35.

The screw 24 has a knurled head 34 which is slidably mounted on the screw but non-rotatably mounted by a pin 34a, and which is pressed toward the boss 26 by a spring 36. The boss 26 is recessed at 37 to engage a projection 38 on the head 34 to keep the screw 24 from rotating when it is in a proper position for pivoting the arm 22 to the ear 12.

The screws 24 and 27 fit into cone-shaped recesses 12a and 13a in the ears 12 and 13. The screw 27 is locked in position by a set screw shown at 27a in Figure 4 of the drawings. In connecting the unit 14 to the unit 11, the screw 27 is properly adjusted with respect to the ear 13 so as to align the locating pin 29 with the aperture 31 in the tip of the screw 27 which is seated firmly in the recess 13a of the ear 13. The screw 24 can be backed up far enough to permit its tip to clear the ear 12 whenever the unit 14 is to be separated from the unit 11. The bar 33 spaces the split ring 18 properly with respect to the ring 19 so that the locating pin 28 will seat in the aperture 30 when the pin 29 seats in the aperture 31. The constructions just described make it easy to apply the unit 14 to a unit 11 that is permanently mounted on a firearm. It is necessary of course, to have some means to hold the unit 14 down on the unit 11 and this particular means will now be described.

Referring now to Figures 1, 2, 4 and 8, it will be noted that the portion 11a of the base unit 11 is provided with a pivoted spring pressed latch lever 40 that is set into a slot 39 in the member 11a. A pivot pin 41 secures the latch lever 40. A spring 42 seated in the portion 11a engages the lever 40 near one end thereof. A finger piece 43 is provided on the lever 40 opposite the spring 42. The lever 40 extends across the lower face of the aperture 30 so that it may engage in a slot 44 that is formed in the locating pin 28. A stop 45 bent up from the lever 40 limits the movement of the lever across the aperture 30 when the locating pin 28 is not seated in the aperture. I find that this securing means is all that is necessary to keep the unit 14 seated on the unit 11. The broad flat bearing surfaces 20 and 21 and the locating pins 28 and 29 provide positive positioning means to hold the unit 14 properly aligned on the unit 11. It is desirable to rigidly secure the locating pin 29 in the aperture 31. I show a lever 46 that is mounted in the portion 11b to be used for this purpose. It works the same as the lever 40.

The base unit 11 carries a peep sight 47 to be used when the telescope T is thrown back out of the way. This peep sight is mounted on the bar 11c by a plate 48. The plate 48 has a depending lug 49 to which a peep sight supporting bar 50 is pivoted by a pivot pin 51. The bar 50 has its end turned up and passed through an aperture 52 to provide the peep sight 47. The aperture 52 is accurately fitted to the up turned peep sight portion 47 of the bar 50. In order to provide means for adjusting the peep sight 47 laterally with respect to the rifle, the plate 48 is pivoted by one screw 53 to the bar 11c and a screw 54 passes through the elongated slot 55 in the plate 48 and is threaded into the bar 11c as illustrated in Figure 7. The peep sight is adjusted vertically with respect to the base 11 by a shouldered screw 56 that is threaded into the bar 50. This screw has a shoulder at 57 which bears against the lower surface of the plate 48 and has a reduced portion 58 which extends up through an aperture 59 that is formed in the plate 48. It is necessary to provide some yielding means to hold the peep sight up in firing position whenever the telescope T is folded back out of the way because the telescope engages the peep sight and pushes it down when the telescope is in sighting position. Any suitable means may be used for this purpose. I show a spring 60 secured to the portion 11b of the base unit 11 and extending beneath the end of the bar 50 and seating in a notch 61 as shown in Figure 7. This spring 60 will hold the peep sight up against the bar 48 whenever the telescope T is thrown back out of the way.

It is believed to be evident from the foregoing description that I have provided a telescope sight mount for firearms which can be applied to the firearm by mounting a simple base unit, utilizing only ordinary screws and holes properly located on the firearm itself. The mount supplies a separable telescope supporting unit which can be taken off and applied to another gun equipped with the base unit. The telescoping supporting unit can also be thrown back out of the way, leaving the gun free for open sight shooting or peep sight shooting. The location of the telescope sight on the firearm is not dependent upon pivots which may become disaligned. A flat surface on the two units and the interlocking locating pins and apertures serve to insure proper alignment at any time the telescope sight is swung into operative position.

Having thus described my invention, I claim:

In a telescope sight mount for rifles, a base bar, a saddle fixed to each end of the bar, each saddle comprising an end portion extending transversely with respect to the bar, the portion having a recess in its lower face laterally offset from the bar to seat upon the rifle and being apertured to receive screws for fastening it to the rifle, a plate mounted on the bar, a peep sight, the plate having an aperture in which said peep sight is movable up and down, a bar suspended from the plate and carrying the peep sight, and spring means urging said bar upwardly.

References Cited in the file of this patent

UNITED STATES PATENTS

| | | |
|---|---|---|
| 1,027,891 | Peck et al. | May 28, 1912 |
| 2,425,130 | Shelley | Aug. 5, 1947 |
| 2,451,266 | Whittemore | Oct. 12, 1948 |
| 2,527,289 | Allen | Oct. 24, 1950 |
| 2,529,801 | Fisk | Nov. 14, 1950 |
| 2,571,935 | Pachmayr et al. | Oct. 16, 1951 |

FOREIGN PATENTS

| | | |
|---|---|---|
| 142,545 | Germany | Jan. 23, 1902 |
| 468,237 | Great Britain | July 1, 1937 |